(12) United States Patent
Morita et al.

(10) Patent No.: US 11,608,103 B2
(45) Date of Patent: Mar. 21, 2023

(54) STEERING WHEEL

(71) Applicant: TOYODA GOSEI CO., LTD., Kiyosu (JP)

(72) Inventors: Bunpei Morita, Kiyosu (JP); Takatoshi Yajima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/677,074

(22) Filed: Feb. 22, 2022

(65) Prior Publication Data

US 2022/0315091 A1 Oct. 6, 2022

(30) Foreign Application Priority Data

Mar. 30, 2021 (JP) ............................. JP2021-057759

(51) Int. Cl.
*B62D 1/04* (2006.01)
*B62D 1/10* (2006.01)
*B62D 1/08* (2006.01)
*B62D 1/06* (2006.01)

(52) U.S. Cl.
CPC ................ *B62D 1/10* (2013.01); *B62D 1/06* (2013.01); *B62D 1/08* (2013.01)

(58) Field of Classification Search
CPC . B62D 1/04; B62D 1/043; B62D 1/06; B62D 1/08; B62D 1/10; B62K 21/00; B62K 21/10; B62K 23/02; F16C 2326/24; F16C 2326/26
See application file for complete search history.

(56) References Cited

U.S. PATENT DOCUMENTS

| | | | | |
|---|---|---|---|---|
| 3,196,709 A | * | 7/1965 | Bickford | B62D 1/14 |
| | | | | D12/175 |
| 7,726,692 B2 | * | 6/2010 | Ozaki | B62D 1/04 |
| | | | | 74/543 |
| 10,933,901 B2 | * | 3/2021 | Kreutz | B62D 1/06 |
| 11,318,980 B2 | * | 5/2022 | Kurokawa | F16C 3/03 |
| 2007/0221007 A1 | | 9/2007 | Ozaki et al. | |
| 2009/0050397 A1 | * | 2/2009 | Onuma | B62D 5/001 |
| | | | | 180/402 |

FOREIGN PATENT DOCUMENTS

| | | | | |
|---|---|---|---|---|
| DE | 102021003987 A1 | * | 9/2021 | |
| EP | 3050775 A1 | * | 8/2016 | ............... B62D 1/06 |
| FR | 3066988 A1 | * | 12/2018 | ............... B62D 1/04 |

(Continued)

*Primary Examiner* — Adam D Rogers
(74) *Attorney, Agent, or Firm* — Posz Law Group, PLC

(57) ABSTRACT

A steering wheel includes a boss, two spokes supported at the boss, a grip fixed to each spoke, and a rotation control mechanism arranged between the boss and each spoke. The rotation control mechanisms are each configured to define a maximum rotation angle by which each grip is rotated from the neutral position in a near-side direction and a maximum rotation angle by which each grip is rotated from the neutral position in a far-side direction. The rotation control mechanisms are each configured to return each grip to the neutral position when a vehicle is traveling straight. The maximum rotation angle in the far-side direction is set to be larger than the maximum rotation angle in the near-side direction in each rotation control mechanism.

4 Claims, 11 Drawing Sheets

(56) References Cited

FOREIGN PATENT DOCUMENTS

| | | | |
|---|---|---|---|
| JP | 2004-034849 | A | 2/2004 |
| JP | 2005-0297772 | A | 10/2005 |
| JP | 2007210383 | A * | 8/2007 |
| KR | 890001634 | Y1 * | 4/1989 |
| KR | 101858398 | B1 * | 6/2018 |
| KR | 102118012 | B1 * | 6/2020 |

* cited by examiner

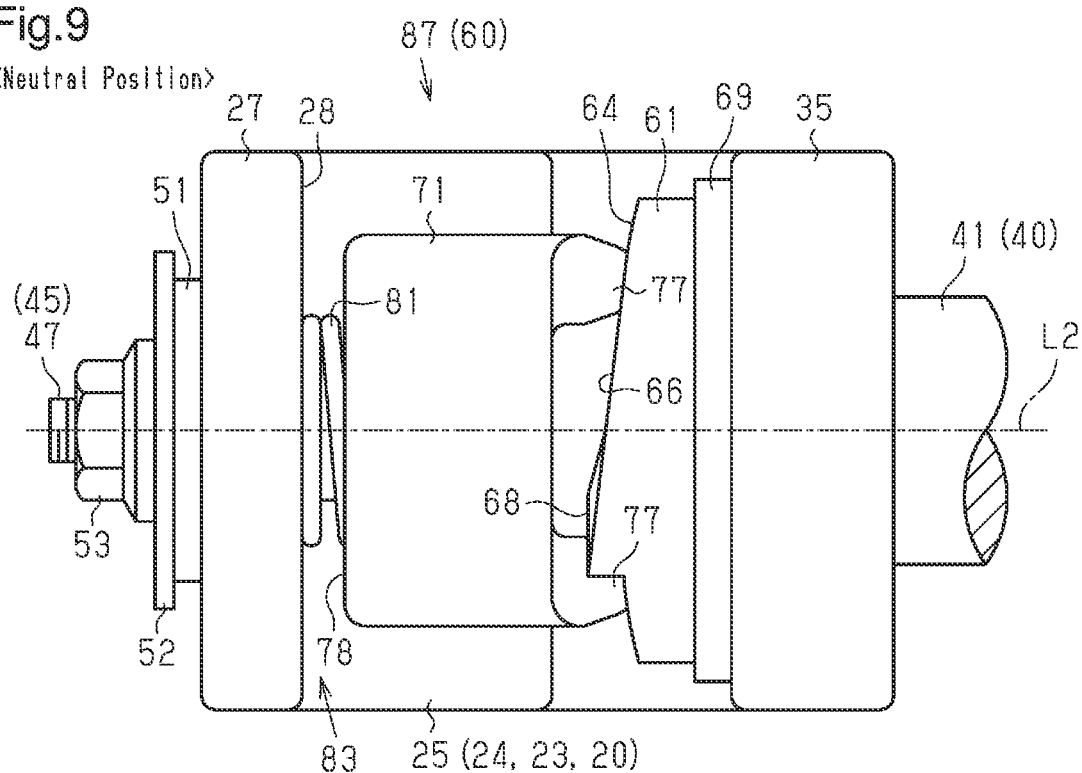
Fig.9 <Neutral Position>
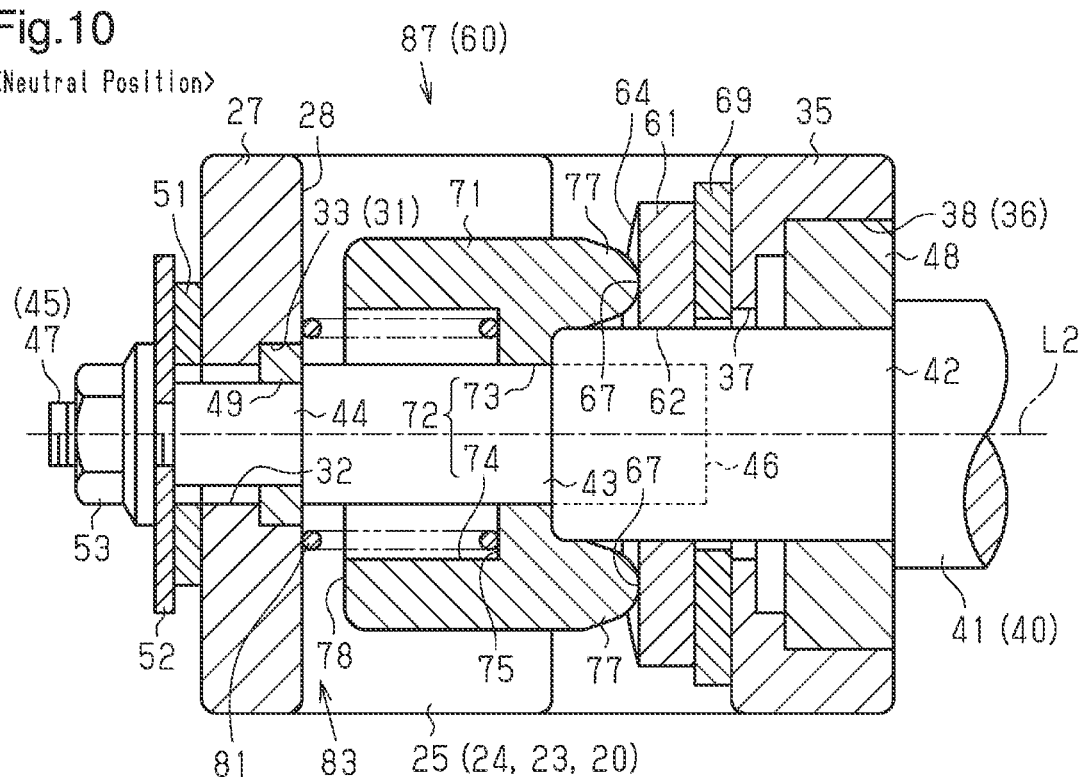
Fig.10 <Neutral Position>

<Neutral Position>

<Neutral Position>

STEERING WHEEL

BACKGROUND

1. Field

The present disclosure relates to a steering wheel operated by a driver when steering a vehicle (e.g., land vehicle).

2. Description of Related Art

Vehicles (e.g., land vehicles) include a steering shaft as a part of a steering device. The steering shaft includes a first axis and rotates about the first axis in both clockwise and counterclockwise directions. A steering wheel held and operated by a driver of a vehicle is coupled to the steering shaft.

Japanese Laid-Open Patent Publication No. 2004-34849 discloses a steering wheel in which a load on the wrist is limited even in a case where the steering wheel is rotated about the first axis to a large extent (e.g., 900 or more) from a position of the steering wheel when the land vehicle is traveling straight.

The steering wheel includes a boss, two spokes, and two grips. The boss is coupled to the steering shaft such that they are integrally rotatable. The two spokes respectively include second axes that extend from the boss away from each other in the left-right direction when the land vehicle is traveling straight. The two spokes are supported by the boss such that the spokes can rotate in both clockwise and counterclockwise directions with respect to the second axes. The two grips are respectively fixed to the ends of the two spokes that are farther from the boss.

In the steering wheel, the two grips can be respectively rotated about the second axes. This allows the driver to keep the wrist at a natural angle by rotating the two grips about the first axis of the steering shaft while rotating the grips about the second axes. Even if the driver rotates the steering wheel about the first axis by 90° or more, the driver does not need to bend the wrist at an unnatural angle. This limits a load on the wrist.

When the land vehicle is traveling straight, the two grips are respectively located on the left and right sides of the boss. The position of each grip about the corresponding second axis in this state is referred to as the neutral position. The direction in which the portion of each grip on the neutral position located upward from the corresponding second axis rotates toward the driver is referred to as the near-side direction. The direction in which the portion rotates away from the driver is referred to as the far-side direction.

In a case where the two grips each located at the neutral position are rotated about the first axis by the driver, the structure of the wrist allows the grip to be rotated to a larger extent when rotated in the far-side direction than when rotated in the near-side direction.

With regard to the right grip, the driver rotates, in the near-side direction, the portion of the right grip located upward from the second axis to rotate the two grips about the first axis in the counterclockwise direction. The driver rotates, in the far-side direction, the portion of the right grip located upward from the second axis to rotate the two grips about the first axis in the clockwise direction. The driver can rotate each grip to a larger extent in the far-side direction than in the near-side direction. The same applies to the left grip.

However, in the steering wheel of Japanese Laid-Open Patent Publication No. 2004-34849, no consideration is given to the above-described difference in the maximum rotation angle depending on the rotation direction. Further, in the steering wheel, no consideration is given to returning each grip to the neutral position when the land vehicle is traveling straight. Accordingly, there is room for improvement in the operability of the grips.

Such a problem would occur not only in a land vehicle but also in vehicles that generally include the conventional steering wheel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A steering wheel that solves the above-described problem is configured to be employed in a vehicle that includes a steering shaft. The steering shaft includes a first axis and rotates in both clockwise and counterclockwise directions with respect to the first axis. The steering wheel includes a boss configured to be attached to the steering shaft such that the boss and the steering shaft are integrally rotatable. The steering wheel includes two spokes respectively including second axes that extend from the boss away from each other in a left-right direction when the vehicle is traveling straight. The spokes are supported at the boss such that the spokes rotate in the clockwise and counterclockwise directions with respect to the second axes. The steering wheel includes a grip fixed to each of the spokes. The steering wheel includes a rotation control mechanism arranged between the boss and the each of the spokes. A position of each of the grips about a corresponding one of the second axes when the vehicle is traveling straight is referred to as a neutral position. A direction in which a portion of the each of the grips located upward from the corresponding one of the second axes rotates toward a driver is referred to as a near-side direction. A direction in which the portion rotates away from the driver is referred to as a far-side direction. The rotation control mechanisms are each configured to define a maximum rotation angle by which the each of the grips is rotated from the neutral position in the near-side direction and a maximum rotation angle by which the each of the grips is rotated from the neutral position in the far-side direction. The rotation control mechanisms are each configured to return the each of the grips to the neutral position when the vehicle is traveling straight. The maximum rotation angle in the far-side direction is set to be larger than the maximum rotation angle in the near-side direction in each of the rotation control mechanisms.

Other features and aspects will be apparent from the following detailed description, the drawings, and the claims.

BRIEF DESCRIPTION OF THE DRAWINGS

FIG. 9 is a partial enlarged front view of the rotation control mechanism shown in FIG. 11.

FIG. 10 is a partial cross-sectional view of the rotation control mechanism shown in FIG. 9.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of a steering wheel used in a steering wheel for a land vehicle in which a steer-by-wire system is employed will now be described with reference to the drawings.

The steer-by-wire system is used to perform a steering operation using an electrical signal via an actuator, not through mechanical coupling. In the land vehicle in which this system is employed, the steering wheel can be rotated about a steering shaft to a large extent (e.g., by approximately 150° at the maximum).

The direction in which the land vehicle travels forward is hereinafter referred to as the front. The direction in which the land vehicle travels rearward is hereinafter referred to as the rear. The up-down direction refers to the up-down direction of the land vehicle. The left-right direction refers to the width direction of the land vehicle that coincides with the left-right direction when the land vehicle is traveling forward.

Figure 1:
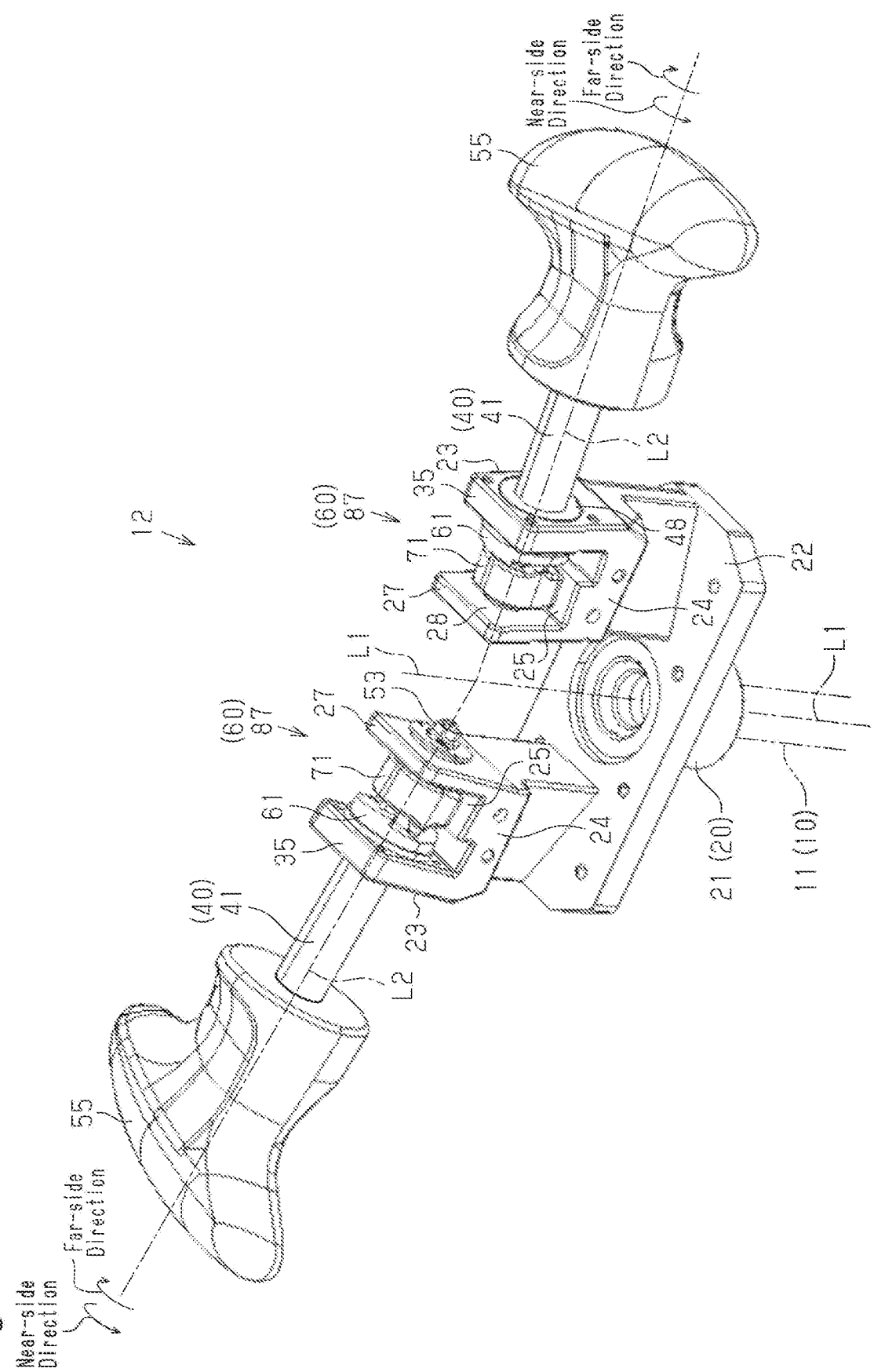
FIG. 1 is a perspective view showing the framework of a steering wheel according to an embodiment.

Referring to FIG. 1, a steering device 10 is arranged at the front of the driver's seat in the passenger compartment. The steering device 10 is operated by a driver (not shown) when steering the land vehicle. The steering device 10 includes a steering shaft 11 and a steering wheel 12. The steering shaft 11 includes a first axis L1. The steering shaft 11 is capable of rotating in both clockwise and counterclockwise directions with respect to the first axis L1. The steering shaft 11 is arranged and inclined with respect to the front-rear direction of the land vehicle such that the rear of the steering shaft 11 becomes higher.

In the present embodiment, the first axis L1 is used as a reference to describe each part of the steering wheel 12. The direction along the first axis L1 is simply referred to as the front-rear direction. The front in the direction along the first axis L1 is simply referred to as frontward, front, or the like. The rear in the direction along the first axis L1 is simply referred to as rearward or rear.

FIG. 1 shows only the framework of the steering wheel 12.

The steering wheel 12 includes a boss 20, a pair of spokes 40, and a pair of grips 55. These components will now be described.

Boss 20

The boss 20 includes a cylindrical portion 21, a plate portion 22, and a pair of supports 23. The cylindrical portion 21 is coupled to the rear end of the steering shaft 11 such that the cylindrical portion 21 and the steering shaft 11 are integrally rotatable. The plate portion 22 is flat. The plate portion 22 is arranged such that its thickness direction matches the front-rear direction of the steering wheel 12. The plate portion 22 is fixed to the rear end of the cylindrical portion 21. The two supports 23 are located rearward from the plate portion 22 and located so as to face each other with the first axis L1 in between. Each support 23 is fixed to the plate portion 22 at the front end of the support 23. The two supports 23 are shaped to be symmetric with respect to a plane of the first axis L1.

Figure 2:
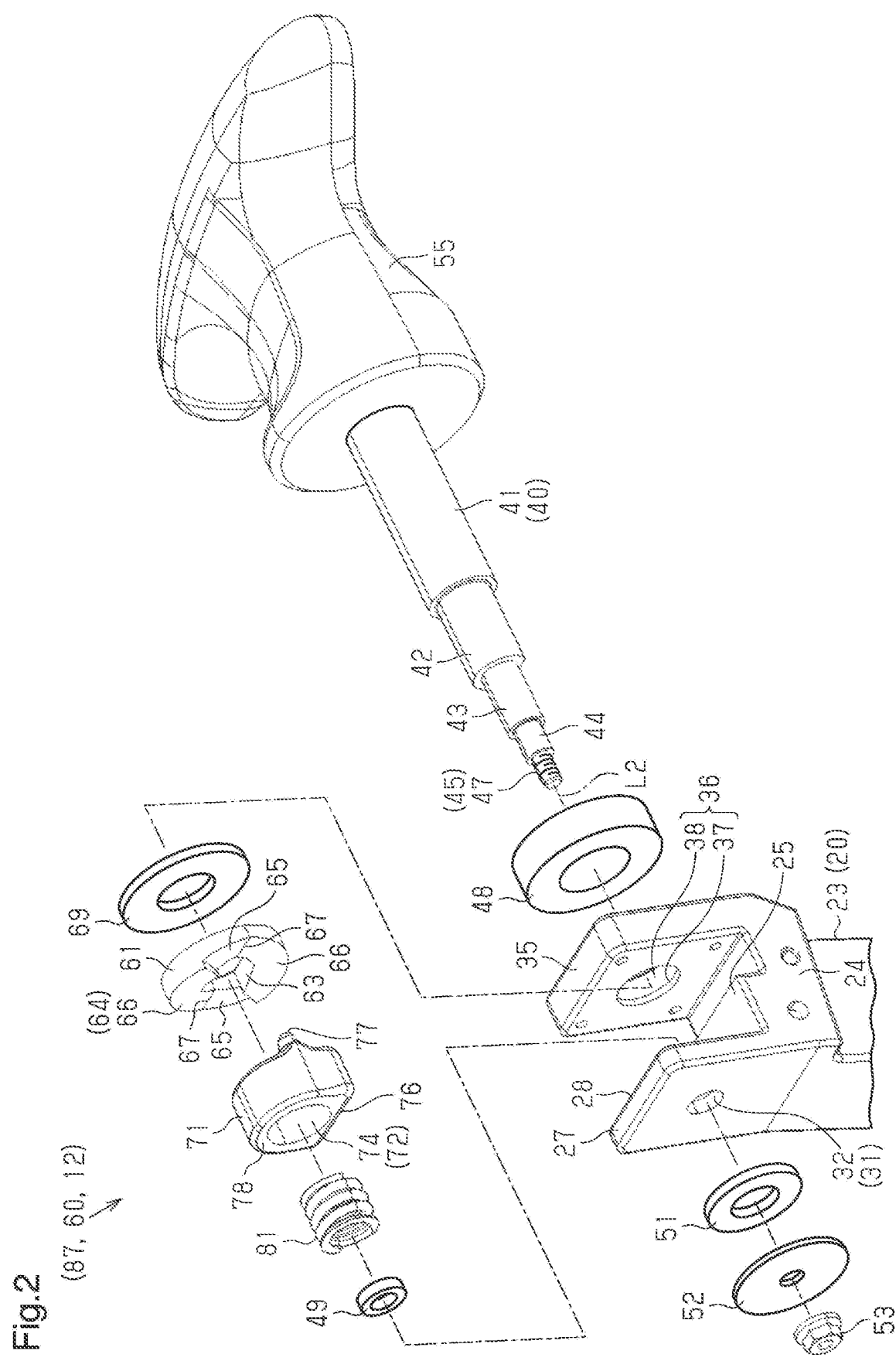
FIG. 2 is a partial exploded perspective view of the framework of the steering wheel shown in FIG. 1.

As shown in FIGS. 1 and 2, each support 23 includes a front wall 24 and a pair of support walls 27, 35. The front wall 24 includes a flat first restricting surface 25 extending along a second axis L2 of the spoke 40. The two support walls 27, 35 are flat and are orthogonal to the support walls 27, 35. The two support walls 27, 35 protrude rearward from the front wall 24 with the support walls 27, 35 spaced apart from each other in parallel in a direction along the second axis L2.

As shown in FIGS. 2 and 10, the support wall 27 includes an insertion hole 31 extending in the direction along the second axis L2. The insertion hole 31 includes a small-diameter portion 32 and a large-diameter portion 33, which has a larger inner diameter than the small-diameter portion 32. The small-diameter portion 32 is located closer to the first axis L1 than the large-diameter portion 33.

As shown in FIGS. 9 and 10, the support wall 27 includes a second restricting surface 28. The second restriction surface 28 faces the support wall 35 and is defined by a portion of the support wall 27 surrounding the insertion hole 31 (large-diameter portion 33).

The support wall 35 includes an insertion hole 36 extending in the direction along the second axis L2. The insertion hole 36 includes a small-diameter portion 37 and a large-diameter portion 38, which has a larger inner diameter than the small-diameter portion 37. The small-diameter portion 37 is located closer to the first axis L1 than the large-diameter portion 38.

Spoke 40

Referring to FIGS. 1 and 2, each spoke 40 includes a shaft having the corresponding second axis L2. The two spokes 40 are located outward from the boss 20 in the radial direction and located so as to face each other with the boss 20 in between. The two second axes L2 extend from the boss 20 away from each other in the left-right direction when the land vehicle is traveling straight. In other words, the two second axes L2 radially extend from the boss 20 toward the opposite sides in the left-right direction. The phrase "radially extend" not only indicates that the two second axes L2 extend along a surface that intersects the first axis L1 at the right angle but also indicates that the two second axes L2 extend along a surface that intersects the first axis L1 at an angle close to the right angle. For example, the phrase "radially extend" indicates that the two second axes L2 extend along a surface intersecting the first axis L1 at an angle close to the right angle such that the second axes L2 become closer to the driver as the second axes L2 become farther from the first axis L1 toward the outer side in the radial direction.

The two spokes 40 are shaped to be symmetric with respect to the plane of the first axis L1. Thus, only the right spoke 40 will be hereinafter described.

As shown in FIGS. 2 and 10, the spoke 40 partly includes a columnar general portion 41. The spoke 40 includes portions closer to the first axis L1 than the general portion 41, namely, multiple (four) columnar shaft portions 42, 43, 44, 45. The shaft portions 42, 43, 44, 45 are shaped such that the ones closer to the first axis L1 have a smaller outer diameter. The shaft portion 42 partly includes a flat portion 46 that extends in parallel to the second axis L2 (refer to FIG. 10). The outer circumference of the shaft portion 45 includes an external thread 47.

The spoke 40 is supported by the boss 20 at an end of the spoke 40 closer to the first axis L1 such that the spoke 40 can rotate in both the clockwise and counterclockwise directions with respect to the second axis L2. More specifically, a bearing 48 is attached to the large-diameter portion 38 of the support wall 35, and the shaft portion 42 is inserted through the bearing 48. The spoke 40 is supported by the bearing 48 at the support wall 35 such that the spoke 40 can rotate in both the clockwise and counterclockwise directions. A bearing 49 is attached to the large-diameter portion 33 of the support wall 27, and the shaft portion 44 is inserted through the bearing 49. The spoke 40 is supported by the bearing 49 at the support wall 27 such that the spoke 40 can rotate in both the clockwise and counterclockwise directions.

A part of the shaft portion 44 and the entire shaft portion 45 in the spoke 40 protrude from the support wall 27 toward the first axis L1 and are inserted through a sliding washer (thrust washer) 51 and a washer 52. Further, a nut 53 is fastened to the shaft portion 45.

Grip 55

Referring to FIGS. 1 and 2, the two grips 55 are held by the hands of the driver. The two grips 55 are shaped to be symmetric with respect to the plane of the first axis L1. Each grip 55 is fixed to one of the opposite ends of the corresponding spoke 40 that is farther from the first axis L1. Each grip 55 can rotate integrally with the corresponding spoke 40 in both the clockwise and counterclockwise directions about the second axis L2.

Figure 11:
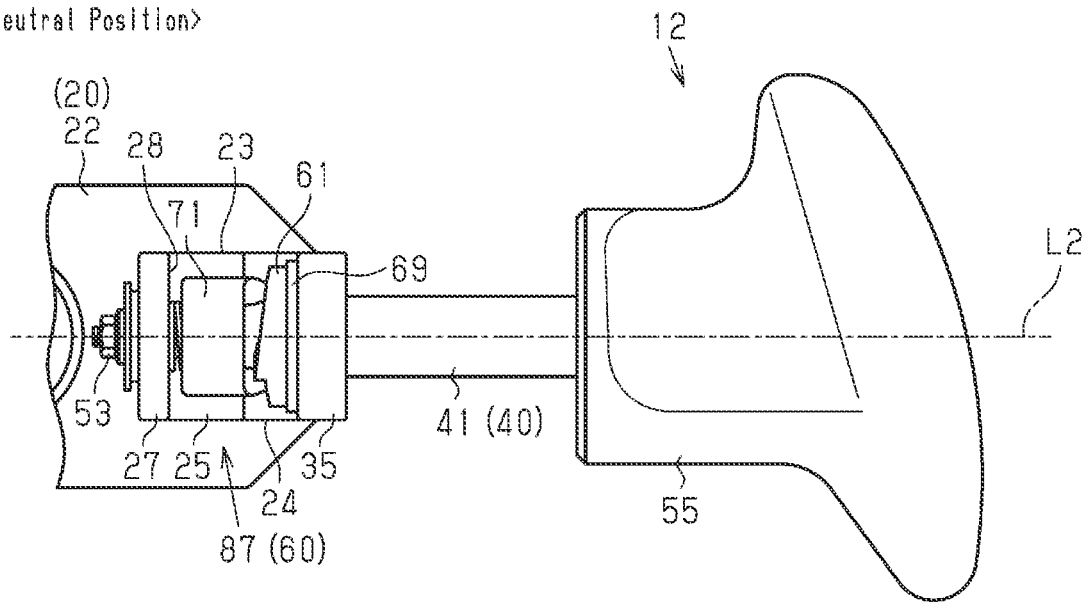
FIG. 11 is a partial front view showing the framework of the steering wheel when the grip is located at the neutral position.
Figure 12:
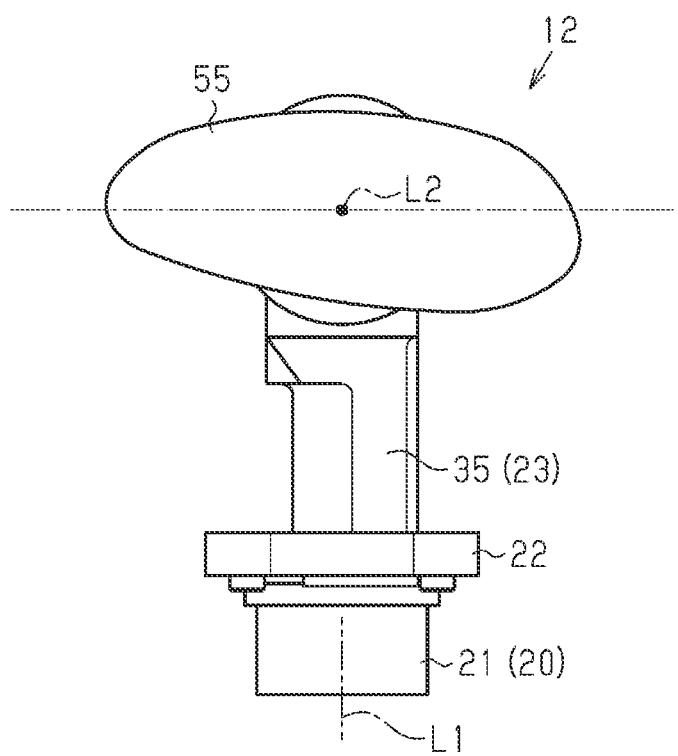
FIG. 12 is a side view of the framework shown in FIG. 11.
Figure 13:
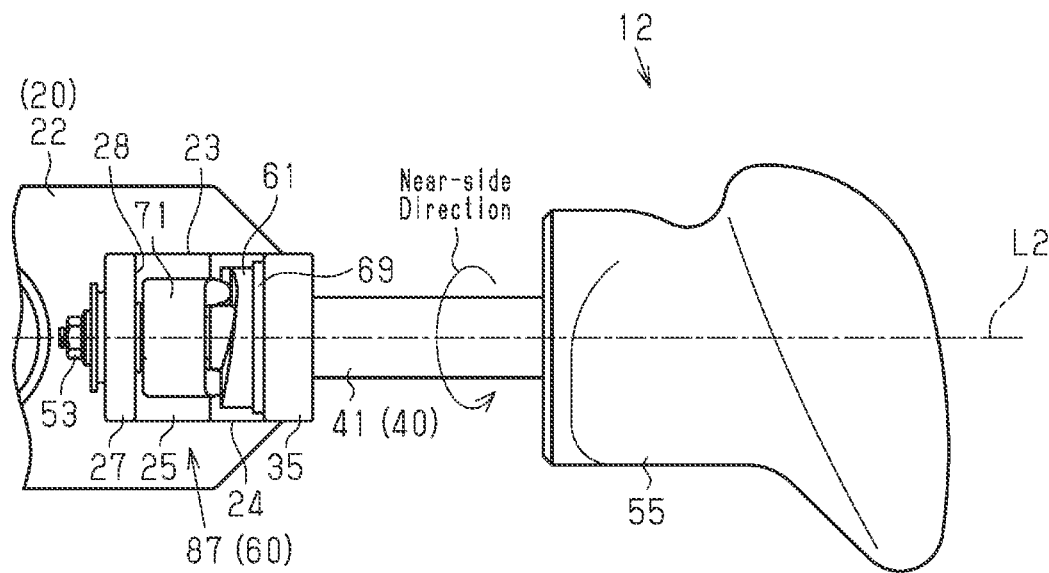
FIG. 13 is a partial front view showing the framework of the steering wheel when the grip is rotated from the neutral position in the near-side direction by a maximum rotation angle.

As shown in FIGS. 11 and 12, the position of each grip 55 about the second axis L2 when the land vehicle is traveling straight is referred to as the neutral position. As shown in FIG. 1, the direction in which the portion of each grip 55 located upward from the corresponding second axis L2 rotates toward the driver is referred to as the near-side direction. The direction in which the portion of each grip 55 located upward from the corresponding second axis L2 rotates away from the driver is referred to as the far-side direction.

As shown in FIGS. 1 and 2, a rotation control mechanism 60 is arranged between the boss 20 and each spoke 40. The two rotation control mechanisms 60 are structured to be symmetric with respect to the plane of the first axis L1. Thus, only the right rotation control mechanism 60 will be hereinafter described.

Rotation Control Mechanism 60

Figure 7:
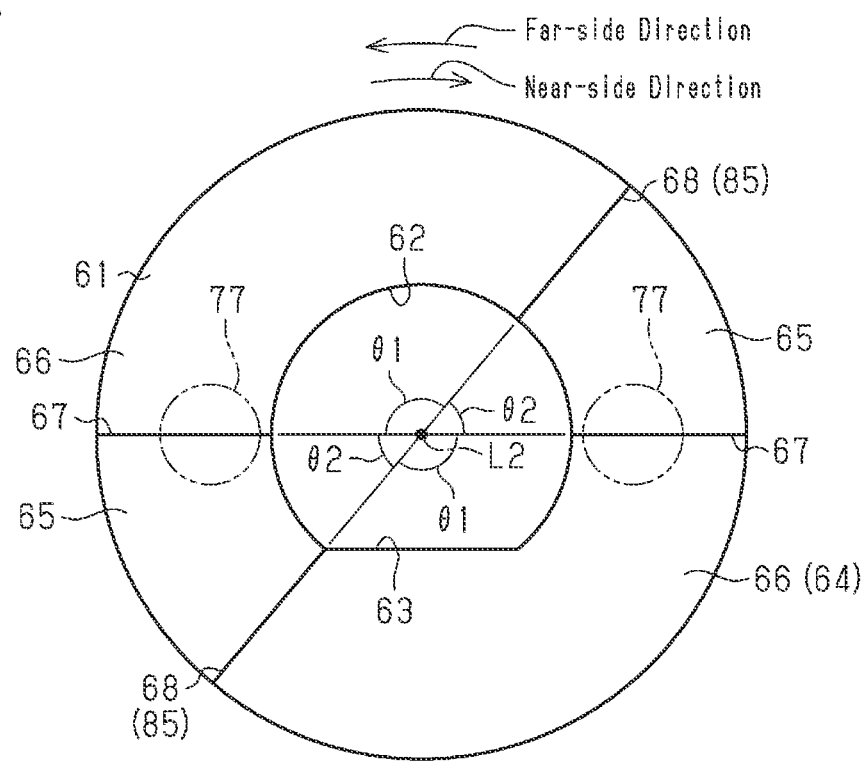
FIG. 7 is a side view showing the rotation cam of FIG. 3 as seen from the first axis.

The rotation control mechanism 60 includes the following functions (refer to FIG. 7).

Define a maximum rotation angle θ2 by which the grip 55 is rotated from the neutral position in the near-side direction.

Define a maximum rotation angle θ1 by which the grip 55 is rotated from the neutral position in the far-side direction.

Return the grip 55 to the neutral position when the land vehicle is traveling straight.

Figure 3:
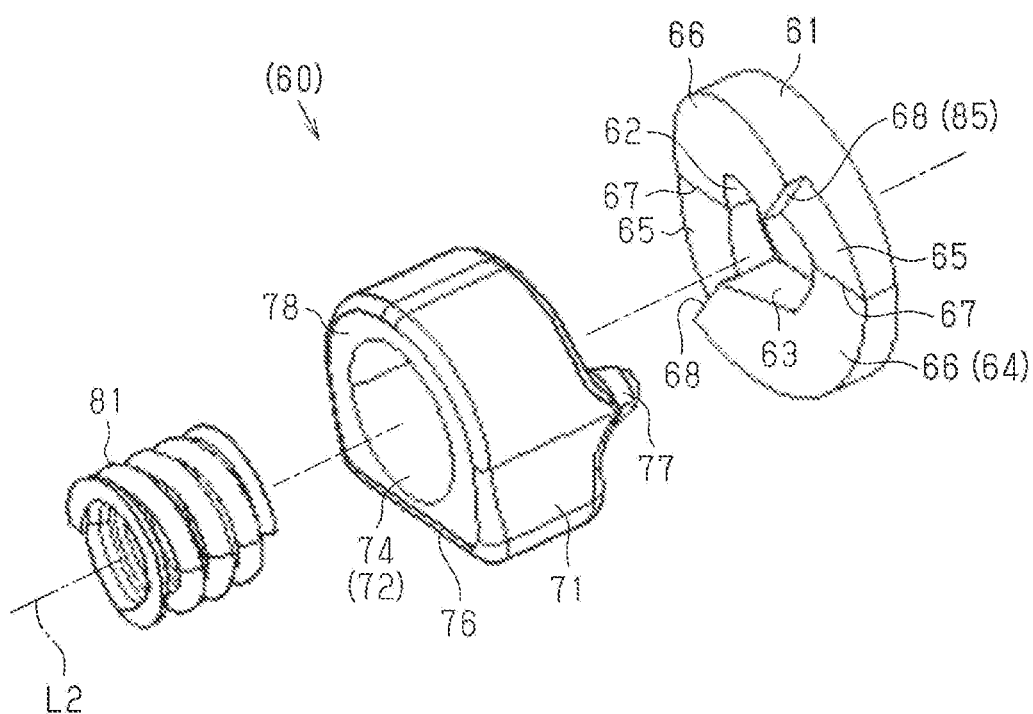
FIG. 3 is an exploded perspective view of the rotation cam, the pusher, and the elastic member of the steering wheel shown in FIG. 1.

As shown in FIGS. 1 to 3, the rotation control mechanism 60 mainly includes a rotation cam 61, a pusher 71, and an elastic member 81. These components will now be described.

Rotation Cam 61

Figure 6:
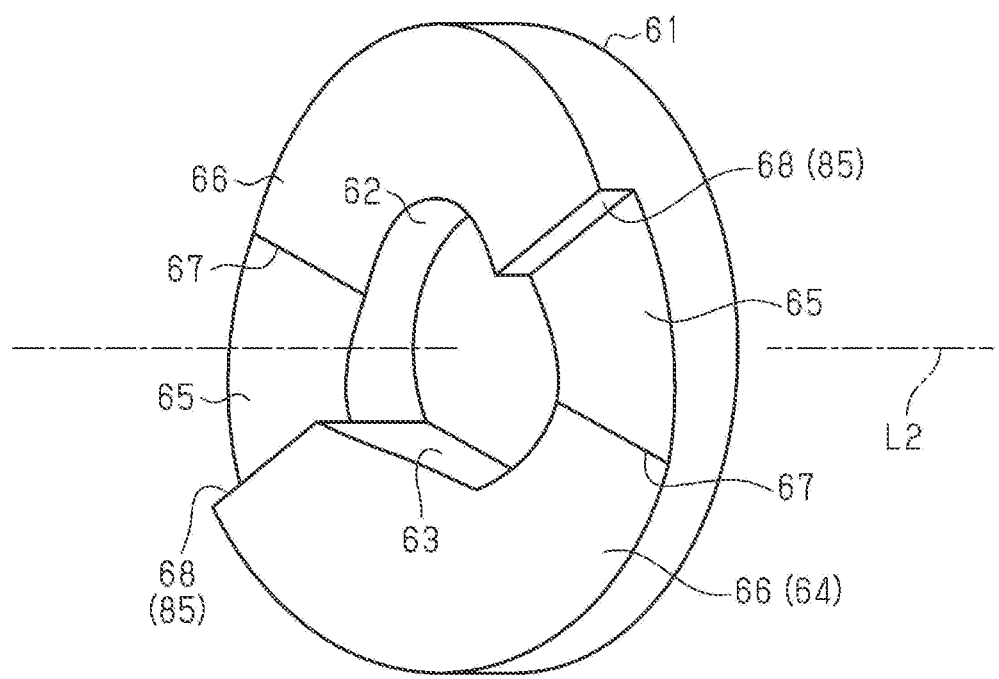
FIG. 6 is a perspective view showing the rotation cam of FIG. 3 as seen from the first axis.

As shown in FIGS. 6 and 7, the rotation cam 61 includes an insertion hole 62 extending in the direction along the second axis L2 and has an entirely annular shape. The insertion hole 62 is mostly curved in an arcuate manner with respect to the second axis L2. The insertion hole 62 partly includes a flat portion 63. As shown in FIGS. 9 and 10, the rotation cam 61 is arranged between the two support walls 27, 35 at a position closer to the support wall 35 by a sliding washer 69. The shaft portion 42 is inserted through the sliding washer 69. Further, the shaft portion 42 is inserted through the rotation cam 61 such that the flat portion 46 faces the flat portion 63 of the insertion hole 62. These insertions allow the rotation cam 61 to be attached to the spoke 40 such that they rotate integrally.

Figure 8:
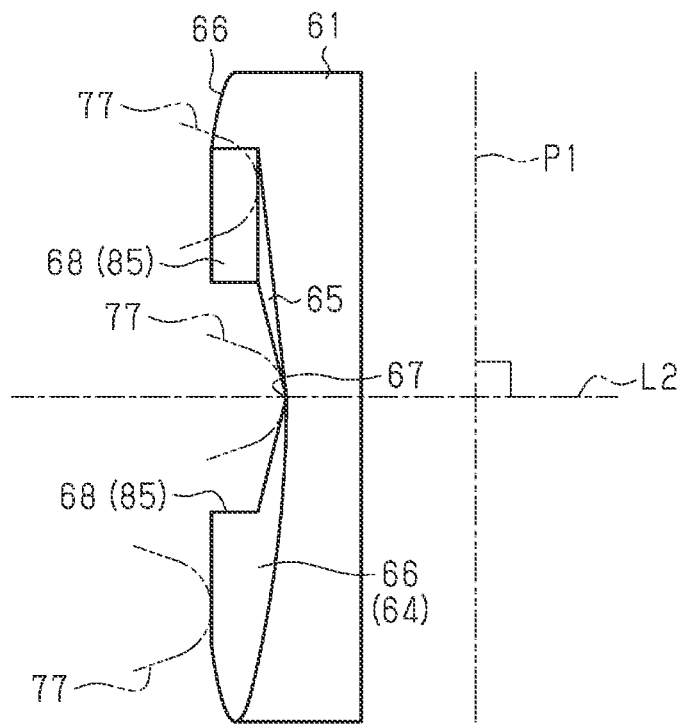
FIG. 8 is a front view showing the rotation cam of FIG. 3.

As shown in FIGS. 6 to 8, the rotation cam 61 includes a cam surface 64 on one of the two surfaces of the rotation cam 61 in the direction along the second axis L2 that is closer to the first axis L1. The cam surface 64 is arranged over the entire circumference of the rotation cam 61.

The cam surface 64 includes two inclined surfaces 65 and two inclined surfaces 66. One of the inclined surfaces 65 and one of the inclined surfaces 66 form a pair. That is, the cam surface 64 includes two pairs, each pair including one of the inclined surfaces 65 and one of the inclined surfaces 66. The inclined surfaces 65, 66 in each pair account for the half (180°) of the surroundings of the second axis L2. The inclined surfaces 65, 66 each have an arcuate shape that bulges outward in the radial direction of the rotation cam 61.

The inclined surface 65 in each pair contacts a contact portion 77 of the pusher 71 (described later) when the grip 55 is rotated in the near-side direction. The inclined surface 66 in each pair contacts the contact portion 77 when the grip 55 is rotated in the far-side direction.

The inclined surfaces 65, 66 in each pair are inclined in opposite directions with respect to a plane P1 that is orthogonal to the second axis L2. The inclination angles of the inclined surfaces 65, 66 are set to be equal to each other regardless of where the inclined surfaces 65, 66 are located about the second axis L2. In other words, the inclined surfaces 65, 66 are each inclined at a single angle with respect to the plane P1. The inclination angles of the inclined surfaces 65, 66 in each pair with respect to the plane P1 are set to be equal to each other.

The inclined surfaces 65, 66 in each pair are adjacent to each other about the second axis L2. The two inclined surfaces 65, 66 are connected to each other with a boundary 67 in between at the ends of the inclined surfaces 65, 66 closer to the grip 55. Each boundary 67 is located at a position of the inclined surfaces 65, 66 closest to the grip 55 in the direction along the second axis L2. The inclined surfaces 65, 66 become farther from the grip 55 in the direction along the second axis L2 as the inclined surfaces 65, 66 become farther from the boundary 67 in the circumferential direction about the second axis L2.

The inclined surface 65 in one of the pairs and the inclined surface 66 in the other pair are adjacent to each other about the second axis L2.

Pusher 71

Figure 4:
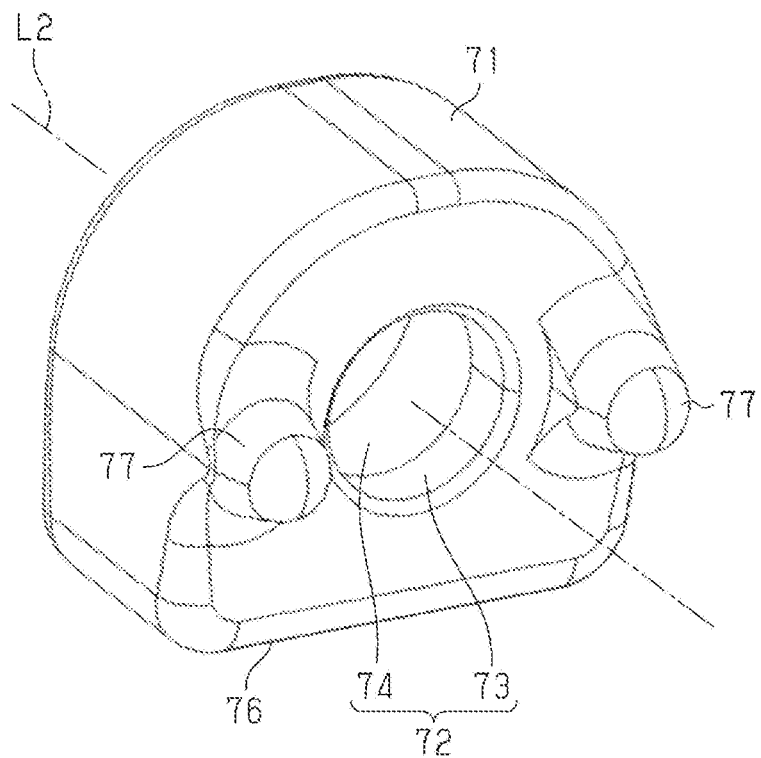
FIG. 4 is a perspective view showing the pusher of FIG. 3 as seen from the grip.
Figure 5:
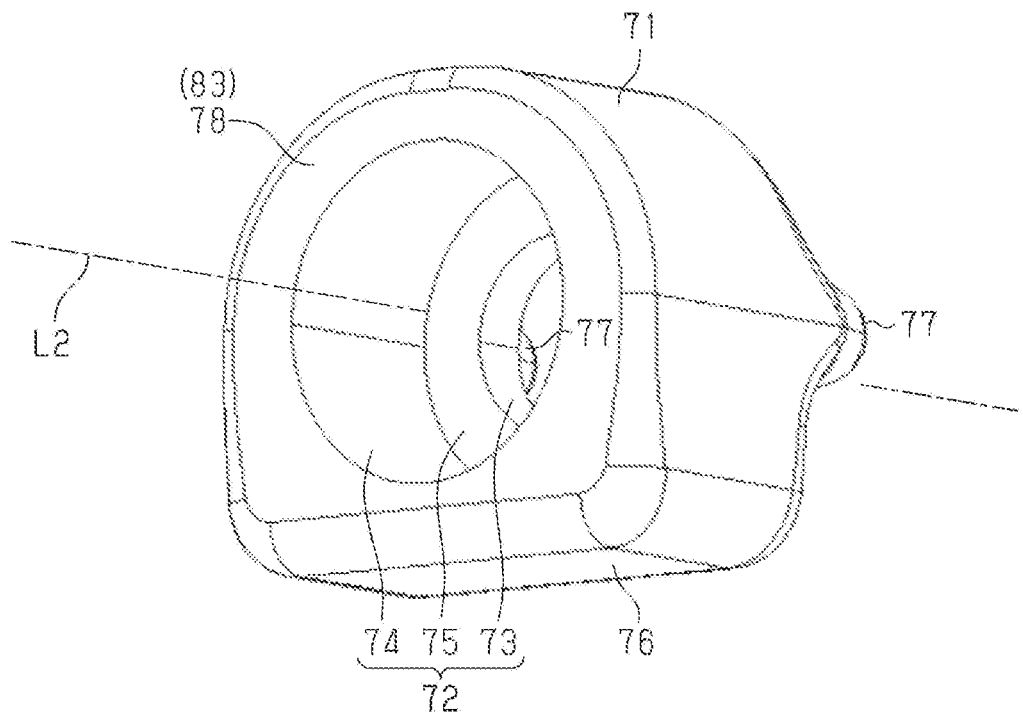
FIG. 5 is a perspective view showing the pusher of FIG. 3 as seen from the first axis.

As shown in FIGS. 4 and 5, the pusher 71 includes an insertion hole 72 extending in the direction along the second axis L2 and has an entirely annular shape. The insertion hole 72 includes a small-diameter portion 73 and a large-diameter portion 74, which has a larger inner diameter than the small-diameter portion 73. The small-diameter portion 73 and the large-diameter portion 74 are adjacent to each other in the direction along the second axis L2 with a step 75 in between. The large-diameter portion 74 is located closer to the first axis L1 than the small-diameter portion 73. As shown in FIG. 10, the shaft portion 43 of the spoke 40 is inserted through the pusher 71 in the insertion hole 72.

The pusher 71 is arranged such that the pusher 71 can slide in the direction along the second axis L2 with the rotation of the pusher 71 restricted. More specifically, as shown in FIGS. 4 and 5, the pusher 71 includes a flat first restricted surface 76 extending in the direction along the second axis L2. The first restricted surface 76 of the pusher 71 is in contact with the above-described first restricting surface 25 of the support 23 such that the pusher 71 can slide on the first restricting surface 25 (refer to FIG. 2).

The pusher 71 includes a pair of contact portion 77. In the pusher 71, the two contact portions 77 are located so as to face each other with the second axis L2 in between. Each contact portion 77 protrudes toward the grip 55 along the second axis L2. Each contact portion 77 includes a spherical tip surface. The spherical surface of each contact portion 77 is in contact with the cam surface 64.

Elastic Member 81

Referring to FIGS. 3 and 10, the elastic member 81 is used to bias the pusher 71 toward the rotation cam 61. In the present embodiment, the elastic member 81 is a compression coil spring. The elastic member 81 is located about the shaft portion 43 of the spoke 40. The elastic member 81 is mostly located in the large-diameter portion 74 of the pusher 71. The elastic member 81 is located so as to be compressed between the support wall 27 and the step 75 of the pusher 71 in the direction along the second axis L2. Thus, the elastic member 81 constantly gives the pusher 71 a biasing force acting toward the rotation cam 61.

The rotation control mechanism 60 further includes a restricting portion that defines the maximum rotation angles $\theta1$, $\theta2$ by which the grip 55 at the neutral position is rotated in the clockwise and counterclockwise directions. The restricting portion includes a first restricting portion 83 and a second restricting portion 85.

First Restricting Portion 83

Figure 17:
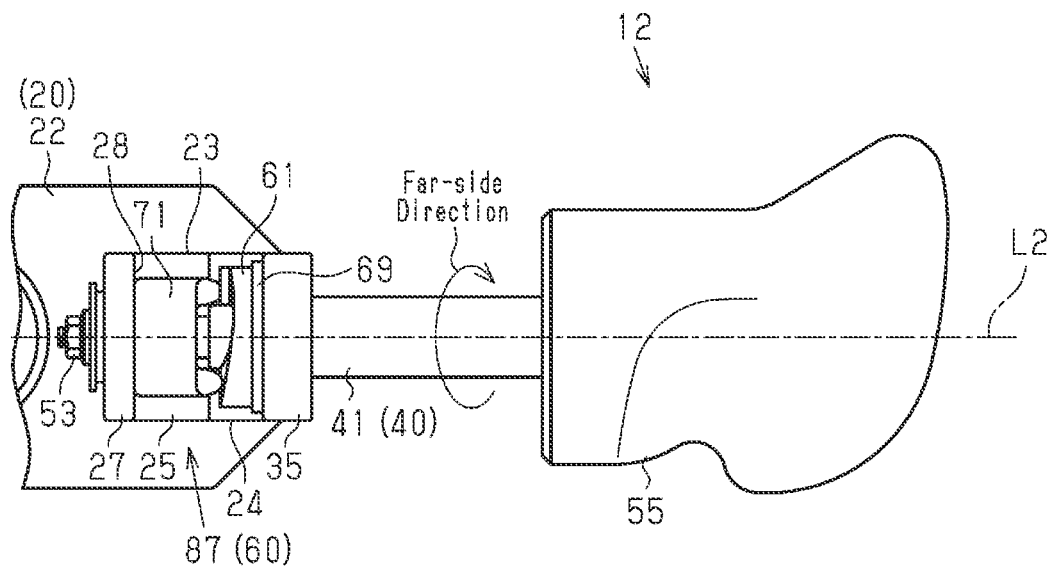
FIG. 17 is a partial front view showing the framework of the steering wheel when the grip is rotated from the neutral position in the far-side direction by a maximum rotation angle.
Figure 18:
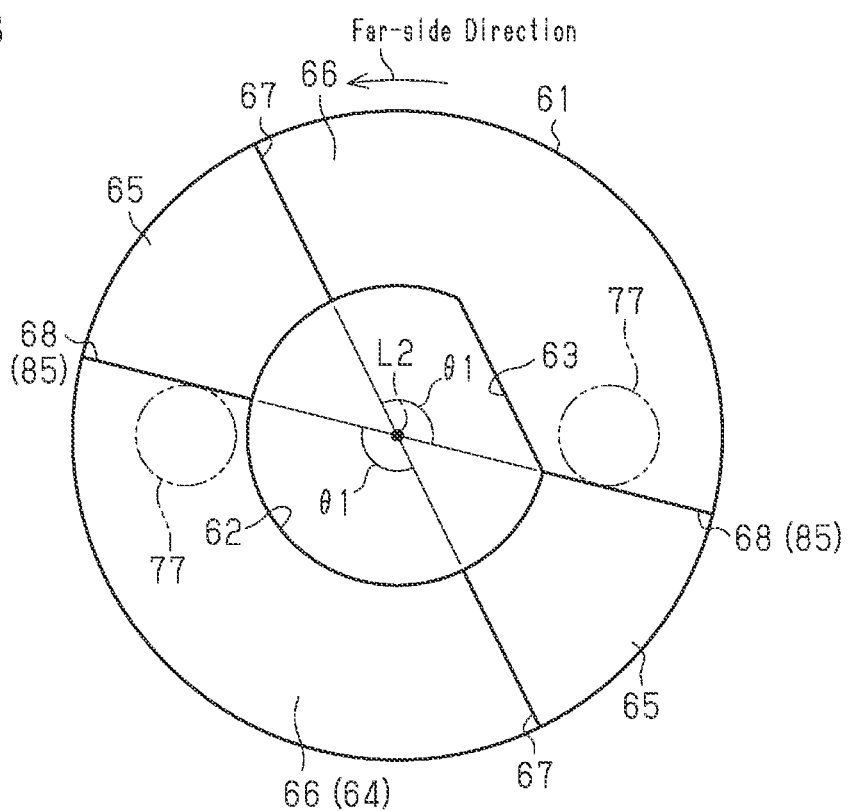
FIG. 18 is a side view showing the rotation cam of FIG. 17 as seen from the first axis.
Figure 19:
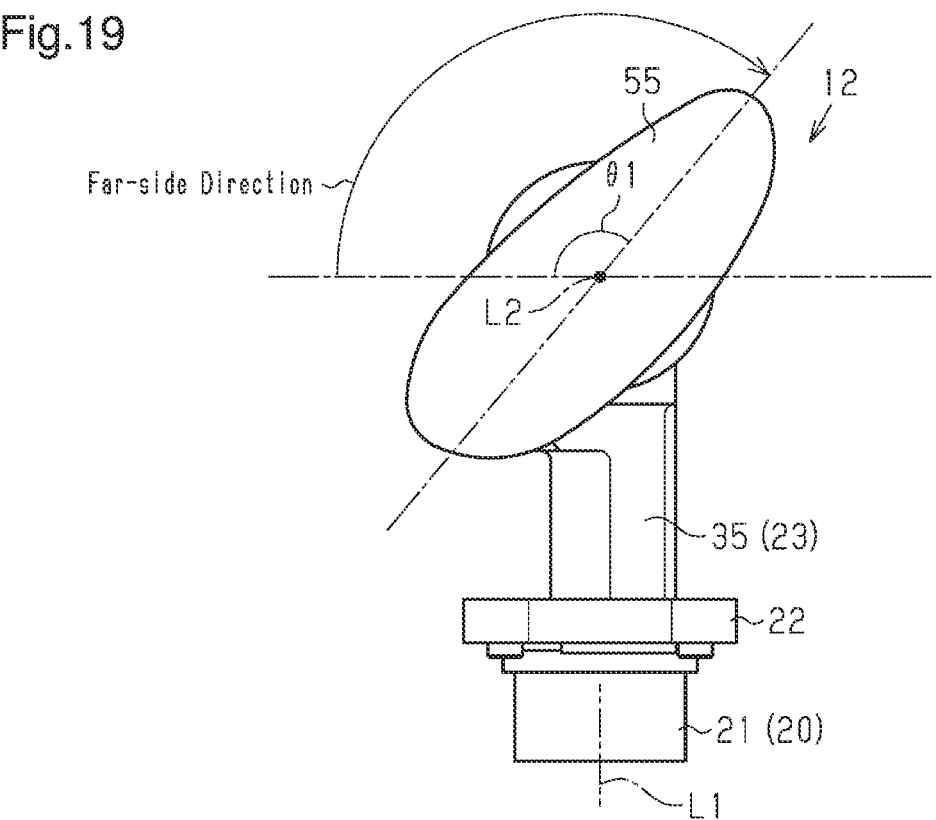
FIG. 19 is a side view of the framework shown in FIG. 17.
Figure 20:
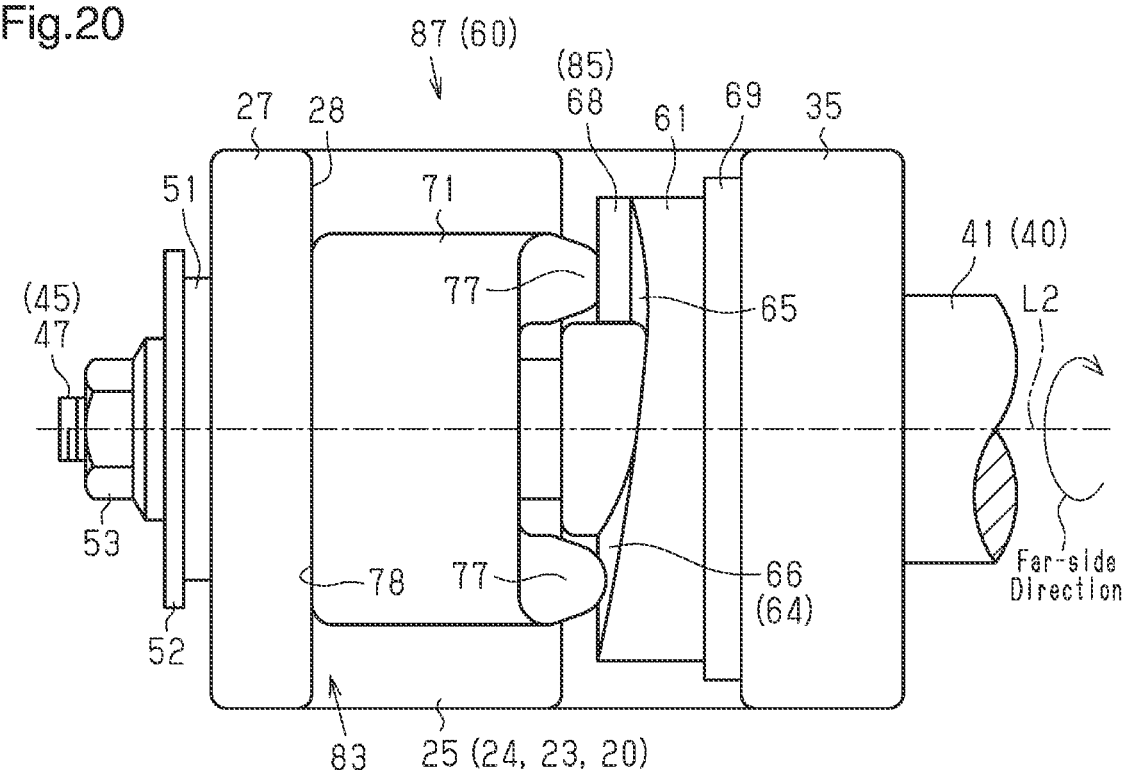
FIG. 20 is a partial enlarged front view showing the rotation control mechanism of FIG. 17.

Referring to FIGS. 17 and 20, the first restricting portion 83 functions to define the maximum rotation angle $\theta1$ by which the grip 55 is rotated in the far-side direction from the neutral position. The first restricting portion 83 achieves this function by restricting the sliding of the pusher 71.

The first restricting portion 83 is defined by the above-described second restricting surface 28 of the support wall 27 and a second restricted surface 78 in the pusher 71. The second restricted surface 78 is one of the two side surfaces of the pusher 71 in the direction along the second axis L2 that is closer to the first axis L1. The second restricted surface 78 is defined by the surrounding portion of the insertion hole 72 (large-diameter portion 74) and faces the second restricting surface 28. The second restricted surface 78 is a flat surface that intersects the second axis L2 (is orthogonal to the second axis L2 in the present embodiment).

As the pusher 71 slides toward the first axis L1 in the direction along the second axis L2, the second restricted surface 78 contacts the second restricting surface 28 so that the first restricting portion 83 restricts the sliding of the pusher 71 toward the first axis L1 as shown in FIG. 20. The first restricting portion 83 restricts the sliding of the pusher 71 so as to restrict the grip 55 from rotating in the far-side direction beyond the maximum rotation angle $\theta1$.

Second Restricting Portion 85

Referring to FIGS. 13 to 16, the second restricting portion 85 functions to define the maximum rotation angle $\theta2$ by which the grip 55 is rotated in the near-side direction from the neutral position. The second restricting portion 85 achieves this function by restricting the rotation of the rotation cam 61 in the near-side direction.

As shown in FIGS. 6 to 8, the second restricting portion 85 includes two flat restricting wall surfaces 68 in the rotation cam 61. Each restricting wall surface 68 extends from an edge of the inclined surface 65 of the corresponding pair that is opposite from the boundary 67 such that the restricting wall surface 68 becomes farther from the grip 55 along the second axis L2. In the present embodiment, in which two pairs of inclined surfaces 65, 66 are arranged and the inclined surface 65 of one of the pairs is adjacent to the inclined surface 66 of the other pair, the restricting wall surface 68 is defined by a surface between the inclined surface 65 of the one of the pairs and the inclined surface 66 of the other pair.

Figure 14:
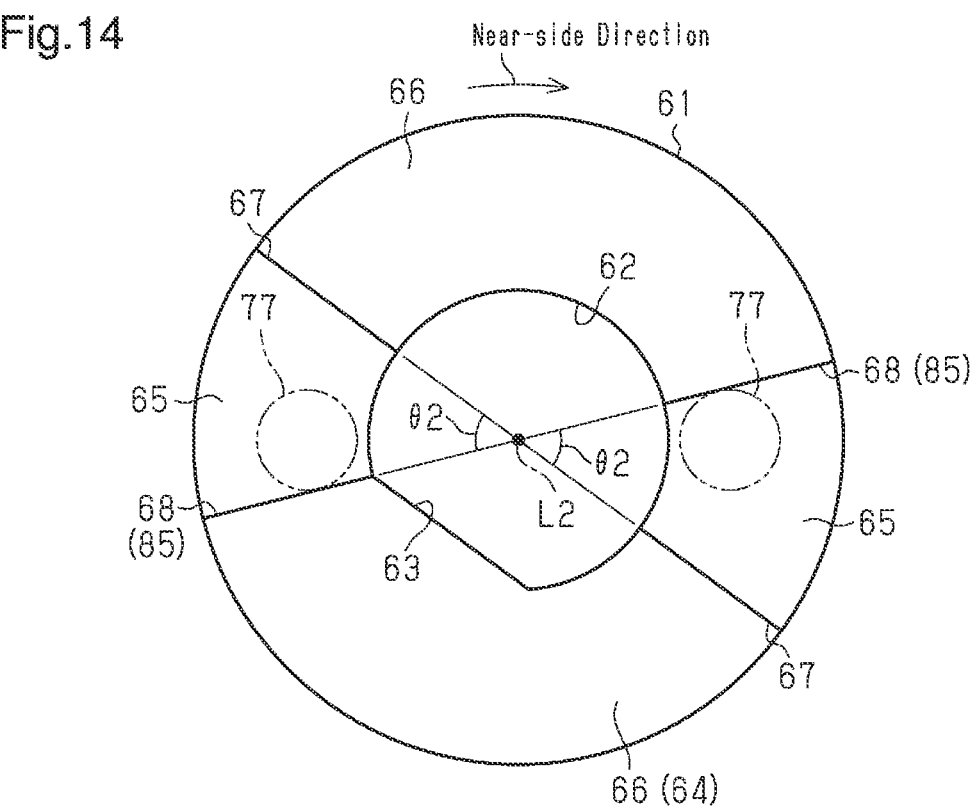
FIG. 14 is a side view showing the rotation cam of FIG. 13 as seen from the first axis.
Figure 15:
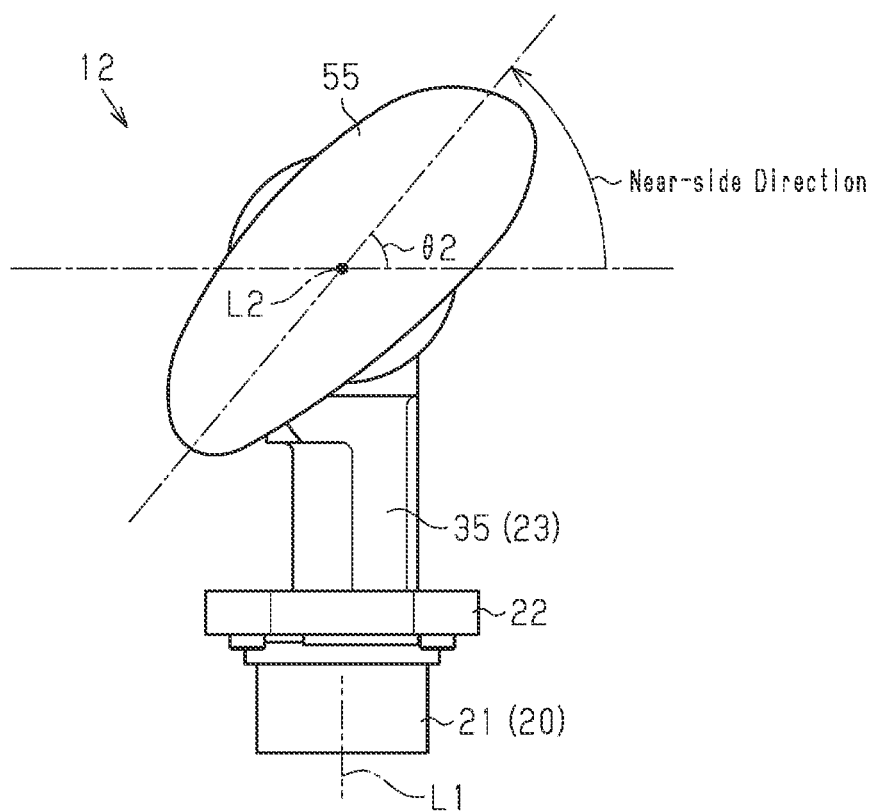
FIG. 15 is a side view of the framework shown in FIG. 13.

As shown in FIG. 14, as the rotation cam 61 rotates, each restricting wall surface 68 contacts the corresponding restricting contact portion 77. This causes the second restricting portion 85 to restrict the rotation of the grip 55 in the near-side direction beyond the maximum rotation angle $\theta2$.

As shown in FIG. 7, the maximum rotation angle $\theta1$ in the far-side direction defined by the first restricting portion 83 is set to be larger than the maximum rotation angle $\theta2$ in the near-side direction defined by the second restricting portion 85. In the present embodiment, the maximum rotation angle θ1 is set to approximately 130° and the maximum rotation angle θ2 is set to approximately 50°. These angles may be changed.

Thus, when the length of each of the inclined surfaces 65, 66 about the second axis L2 is referred to as the circumferential length, the circumferential length of the inclined surface 66 is set to be longer than the circumferential length of the inclined surface 65.

As shown in FIGS. 1 and 2, the support 23 of the boss 20, the rotation cam 61, the pusher 71, and the elastic member 81 in the rotation control mechanism 60 having the above-described structure define a rotation torque generating mechanism 87. The rotation torque generating mechanism 87 generates a rotation torque when the grip 55 is rotated in the clockwise or counterclockwise direction about the second axis L2 and applies the rotation torque to the grip 55.

Referring to FIGS. 7 and 8, the rotation torque generating mechanism 87 minimizes the rotation torque when the grip 55 is located on the neutral position, that is, when each contact portion 77 is in contact with the corresponding boundary 67.

When the grip 55 is rotated in the far-side direction, the rotation torque generating mechanism 87 gradually increases the rotation torque as the rotation angle from the neutral position increases, that is, as the contact position of each inclined surface 66 on the corresponding contact portion 77 becomes farther from the boundary 67. Referring to FIGS. 17 to 20, the rotation torque generating mechanism 87 maximizes the rotation angle when the grip 55 is rotated in the far-side direction by the maximum rotation angle θ1, that is, when the rotation of the grip 55 is restricted by the first restricting portion 83.

Referring to FIGS. 7 and 8, when the grip 55 is rotated in the near-side direction, the rotation torque generating mechanism 87 gradually increases the rotation torque as the rotation angle from the neutral position increases, that is, as the contact position of each inclined surface 65 on the corresponding contact portion 77 becomes farther from the boundary 67. Referring to FIGS. 13 to 16, the rotation torque generating mechanism 87 maximizes the rotation angle when the grip 55 is rotated in the near-side direction by the maximum rotation angle θ2, that is, when the rotation of the grip 55 is restricted by the second restricting portion 85.

It is desired that when the grip 55 is rotated either in the near-side direction or in the far-side direction, the rotation torque has a characteristic of increasing in a range from 0.1[N·m] to 1.5[N·m] as the rotation angle increases. When the rotation torque is in this range, the grip 55 is less likely to be rotated by a small force and can be stably rotated. In addition, an excessive force does not need to be produced to rotate the grip 55. This limits situations in which an excessive load acts on the wrist.

The operation of the present embodiment will now be described. The advantages resulting from the operation will also be described.

As shown in FIGS. 1 and 2, in each rotation control mechanism 60, the first restricted surface 76 of the pusher 71 is in contact with the first restricting surface 25 of the support 23. The first restricted surface 76 and the first restricting surface 25 extend along the second axis L2. Thus, the pusher 71 can slide in the direction along the second axis L2 with the first restricted surface 76 in contact with the first restricting surface 25. Further, the contact of the flat first restricted surface 76 on the flat first restricting surface 25 restricts the pusher 71 from rotating about the second axis L2.

When the land vehicle is traveling straight, the spokes 40 and the grips 55 are located on the left and right sides of the boss 20. As shown in FIGS. 9 to 12, each grip 55 is located on the neutral position in the direction in which the grip 55 rotates with respect to the corresponding second axis L2. In the rotation control mechanisms 60, each contact portion 77 of the pusher 71 biased by the elastic member 81 toward the rotation cam 61 is pressed against the corresponding boundary 67 of the cam surface 64 (refer to the broken lines in FIGS. 7 and 8).

In this state, the rotation torque acting on each grip 55 becomes the minimum. The rotation torque is transmitted, as a steering load produced when each grip 55 is rotated about the second axis L2, to the driver through the hand that holds each grip 55. Accordingly, the steering load felt by the driver becomes the minimum.

From this state, when the driver applies forces to the two grips 55 so as to rotate the grips 55 in the clockwise or counterclockwise direction about the first axis L1 against the rotation torque, the rotation control mechanisms 60 operate as follows.

Referring to FIG. 1, the force applied to each grip 55 by the driver is transmitted through the corresponding spoke 40 and the boss 20 to the steering shaft 11. The transmission of the force causes the two grips 55, the two spokes 40, the boss 20, and the steering shaft 11 to rotate about the first axis L1. This actuates the steering device 10 so as to steer the land vehicle and change the travel direction of the land vehicle. Because of the structure of the wrist of the driver that holds each grip 55, the grip 55 rotates with respect to the first axis L1 while rotating with respect to the corresponding second axis L2 in both the clockwise and counterclockwise directions.

Thus, each grip 55 rotates about the corresponding second axis L2. Accordingly, as compared with when the grips 55 do not rotate about the second axes L2, the driver can rotate the steering wheel 12 about the first axis L1 to a large extent (e.g., 90° or more) while holding the grips 55.

When, for example, the right grip 55 is rotated about the first axis L1 in the counterclockwise direction, the grip 55 is rotated in the near-side direction against the above-described rotation torque as shown in FIGS. 13 to 16.

In the rotation control mechanism 60, the spoke 40 and the rotation cam 61 rotate in the near-side direction (the same direction as the rotation direction of the grip 55) integrally with the grip 55. As the rotation cam 61 rotates, the cam surface 64 rotates about the second axis L2 in the near-side direction. This changes the position of the cam surface 64 in contact with each contact portion 77 of the pusher 71. The change in the contact position from each boundary 67 to the corresponding inclined surface 65 produces a force that pushes the pusher 71 back toward the first axis L1 while elastically deforming (compressing) the elastic member 81. This force causes the pusher 71 to slide toward the first axis L1 along the second axis L2.

The rotation of the rotation cam 61 increases the force as the contact portion 77 of each inclined surface 65 on the corresponding contact portion 77 becomes farther from the boundary 67 in the circumferential direction. As the rotation cam 61 rotates, the compression amount of the elastic member 81 increases and the rotation torque increases. Thus, the rotation torque has a characteristic of changing in correspondence with the rotation angle of the grip 55. The steering load is increased by an increase in the angle by which the grip 55 is rotated from the neutral position in the near-side direction.

Figure 16:
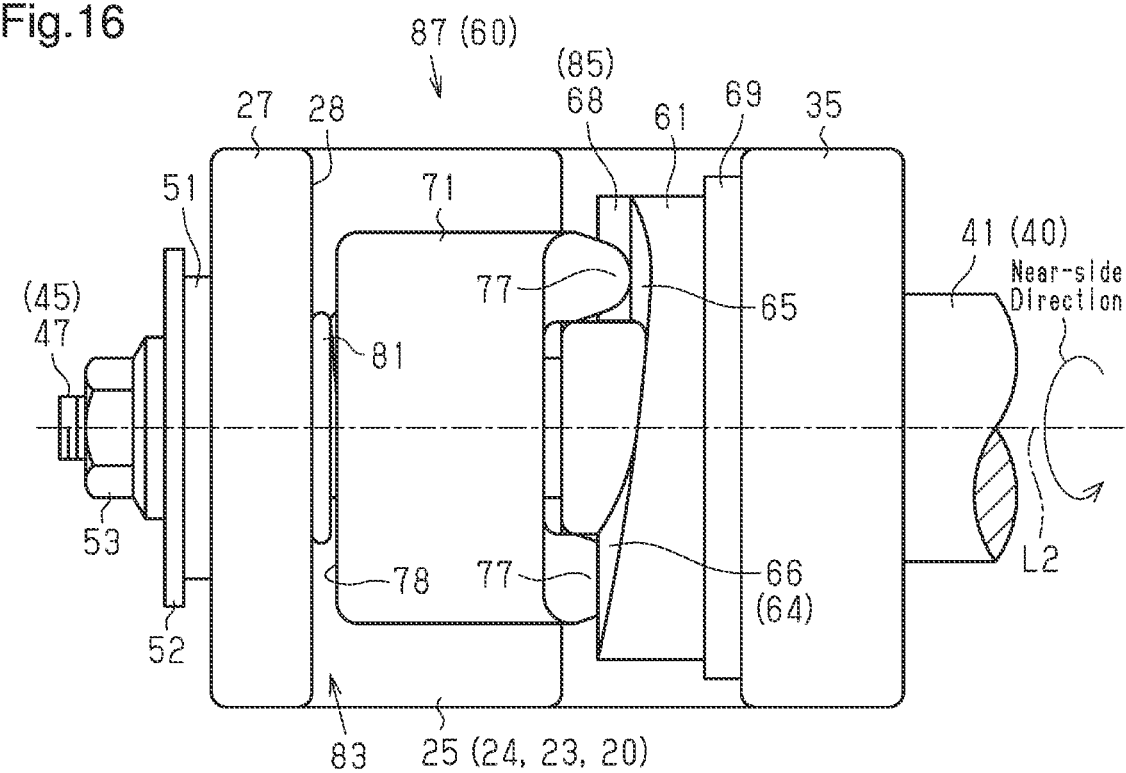
FIG. 16 is a partial enlarged front view showing the rotation control mechanism of FIG. 13.

When the rotation of the grip 55 about the second axis L2 rotates the rotation cam 61 by the maximum rotation angle θ2, each restricting wall surface 68 contacts the corresponding contact portion 77 of the pusher 71 (refer to FIGS. 14 and 16). The contacts restrict further rotation of the rotation cam 61 in the near-side direction. Accordingly, the grip 55 is restricted from rotating beyond the maximum rotation angle θ2. In this state, the compression amount of the elastic member 81 becomes the maximum, and the rotation torque and the steering load become the maximum. The second restricted surface 78 of the pusher 71 is spaced apart from the second restricting surface 28 of the support wall 27 toward the grip 55.

In contrast, when the right grip 55 is rotated about the first axis L1 in the clockwise direction, the grip 55 is rotated in the far-side direction against the above-described rotation torque as shown in FIGS. 17 to 20.

In the rotation control mechanism 60, the spoke 40 and the rotation cam 61 rotate in the far-side direction (the same direction as the rotation direction of the grip 55) integrally with the grip 55. As the rotation cam 61 rotates, the cam surface 64 rotates about the second axis L2 in the far-side direction. This changes the position of the cam surface 64 in contact with each contact portion 77 of the pusher 71. The change in the contact position from each boundary 67 to the corresponding inclined surface 66 produces a force that pushes the pusher 71 back toward the first axis L1 while elastically deforming (compressing) the elastic member 81. This force causes the pusher 71 to slide toward the first axis L1 along the second axis L2.

The rotation of the rotation cam 61 increases the force as the contact portion 77 of each inclined surface 66 on the corresponding contact portion 77 becomes farther from the boundary 67 in the circumferential direction. As the rotation cam 61 rotates, the compression amount of the elastic member 81 increases and the rotation torque increases. Thus, the rotation torque has a characteristic of changing in correspondence with the rotation angle of the grip 55. The steering load is increased by an increase in the angle by which the grip 55 is rotated from the neutral position in the far-side direction.

When the rotation of the grip 55 in the far-side direction causes the rotation cam 61 to rotate, the rotation cam 61 pushes the pusher 71 so that the pusher 71 approaches the support wall 27. When the grip 55 rotates by the maximum rotation angle θ1 together with the rotation cam 61, the second restricted surface 78 of the pusher 71 contacts the second restricting surface 28 of the support wall 27 (refer to FIG. 20). The second restricted surface 78 and the second restricting surface 28 intersect (are orthogonal to) the second axis L2. Thus, the contact of the second restricted surface 78 on the second restricting surface 28 restricts further sliding of the pusher 71 toward the first axis L1. Accordingly, the grip 55 is restricted from rotating beyond the maximum rotation angle θ1. In this state, the compression amount of the elastic member 81 becomes the maximum, and the rotation torque and the steering load become the maximum.

Accordingly, when each grip 55 is located at the neutral position, the rotation torque (steering load) is the minimum. When each grip 55 rotates from the neutral position in either clockwise or counterclockwise direction, the rotation torque (steering load) is larger than the rotation torque (steering load) at the neutral position regardless of the rotation angle. Therefore, the steering wheel 12 of the present embodiment gives a better steering feel than the steering wheel disclosed in Patent Literature 1, in which the rotation torque and steering load are not taken into consideration and the rotation torque and steering load are fixed regardless of the rotation amount (rotation angle).

Further, when the rotation angle is the maximum, the rotation torque (steering load) is the maximum. Thus, the rotation torque (steering load) corresponds to the rotation angle of each grip 55 about the corresponding second axis L2. This further improves the steering feel.

Furthermore, the rotation torque (steering load) has a characteristic of being gradually increased by an increase in the angle by which each grip 55 rotates from the neutral position. This allows the driver to intuitively feel, through the hand that holds each grip 55, rotation of the grip 55 about the corresponding second axis L2 to a large extent performed by the driver. This further improves the steering feel.

As described above, in a case where the grips 55 each located at the neutral position is rotated about the first axis L1 by the driver, the structure of the wrist allows the grip 55 to be rotated to a larger extent when rotated in the far-side direction than in the near-side direction.

In the present embodiment, the first restricting portion 83 defines the maximum rotation angle θ1 by which each grip 55 rotates from the neutral position in the far-side direction. The second restricting portion 85 defines the maximum rotation angle θ2 by which each grip 55 rotates from the neutral position in the near-side direction. In addition, the maximum rotation angle θ1 in the far-side direction is set to be larger than the maximum rotation angle θ2 in the near-side direction. Thus, when each grip 55 is rotated about the first axis L1 to a large extent, the grip 55 can be rotated to a larger extent in the far-side direction than in the near-side direction.

Additionally, the rotation of each grip 55 about the corresponding second axis L2 reduces the load on the wrist of the driver that holds the grip 55. As a result, the operability of the two grips 55 is improved. In addition, the rotation of each grip 55 in the far-side direction to a large extent is less likely to be restricted during the rotation. Thus, the occurrence of bottoming out resulting from the rotation restriction is limited. This allows each grip 55 to smoothly rotate about the corresponding second axis L2 and consequently allows the steering wheel 12 to smoothly rotate about the first axis L1.

Generally, in a land vehicle in which a steer-by-wire system is employed, the steering range of the steering wheel is approximately ±150°. In the present embodiment, each grip 55 can be rotated from the neutral position in the near-side direction by approximately 50° at the maximum and can be rotated from the neutral position in the far-side direction by approximately 130° at the maximum. Thus, the steering wheel 12 can be rotated about the first axis L1 by approximately ±180° by rotating each grip 55 about the corresponding second axis L2. Accordingly, the steering wheel 12 of the present embodiment is suitable for steering a land vehicle in which a steer-by-wire system is employed.

When the force applied to each grip 55 in the near-side or far-side direction is weakened by the driver from the above-described state, the two grips 55, the two spokes 40, the boss 20, and the steering shaft 11 are rotated about the first axis L1 in the direction opposite to the above-described direction. The same applies to a case where a force is applied to each grip 55 so that the grip 55 returns to the position when the land vehicle is traveling straight. In this case, the travel direction of the land vehicle is returned to the straight direction. Each grip 55 rotates with respect to the first axis L1 while rotating with respect to the corresponding second axis L2 in the direction opposite to the above-described direction.

In each rotation control mechanism 60, the spoke 40 and the rotation cam 61 rotate integrally with the grip 55 in the direction opposite to the above-described direction. As the rotation cam 61 rotates, the cam surface 64 rotates about the second axis L2 in the direction opposite to the above-described direction. This changes the position of each of the inclined surfaces 65, 66 of the cam surface 64 in contact with the corresponding contact portion 77 of the pusher 71. As a result, each boundary 67 approaches the corresponding contact portion 77. This reduces the force that pushes the pusher 71 back toward the first axis L1 while elastically deforming (compressing) the elastic member 81. Referring to FIGS. 7, 8, 11, and 12, this force becomes the minimum when each boundary 67 of the cam surface 64 contacts the corresponding contact portion 77.

Thus, the steering load produced when each grip 55 is rotated about the corresponding second axis L2 decreases as the grip 55 becomes closer to the neutral position. Accordingly, as compared with when the steering load is fixed regardless of the rotation amount, the steering feel of the two grips 55 is improved.

In a case where the grips 55 are respectively rotated to the left and right sides of the boss 20 about the first axis L1 in order to return the travel direction of the land vehicle to the straight direction, each boundary 67 contacts the corresponding contact portion 77 of the pusher 71 and the grips 55 are returned to the neutral position when the land vehicle is traveling straight.

Accordingly, the driver only needs to rotate each grip 55 about the first axis L1. This eliminates the need for the operation of returning each grip 55 to the neutral position in addition to the operation of rotating the grip 55 about the first axis L1. The operability of the two grips 55 is also improved in this respect.

In addition to the ones listed above, the present embodiment provides the following advantages.

The rotation torque of each grip 55 about the corresponding second axis L2 corresponds to the compression amount of the elastic member 81 (compression coil spring). As the compression amount increases, the rotation torque increases.

Accordingly, the compression amount can be changed by changing the compression coil spring to, for example, a compression coil spring that has a different spring constant. The compression amount can also be changed by changing the inclination angles of the inclined surfaces 65, 66 with respect to the plane P1, which is orthogonal to the second axes L2.

Accordingly, by changing at least one of the spring constant and the inclination angle, the compression amount of the compression coil spring can be changed and the relationship between the rotation angle and the rotation torque of each grip 55 about the corresponding second axis L2 (the characteristics of the rotation angle and the rotation torque) can be changed at lower costs.

In the present embodiment, each pusher 71 includes two contact portions 77. The two contact portions 77 are located so as to face each other with the second axis L2 in between. The cam surface 64 includes two pairs of inclined surfaces 65, 66. The boundaries 67 of the pairs are located so as to face each other with the second axis L2 in between. Each contact portion 77 is in contact with the corresponding one of the inclined surfaces 65, 66 of the pairs.

Accordingly, as compared with when the pusher 71 includes only one contact portion 77 and the rotation cam 61 includes only one pair of inclined surfaces 65, 66, the contact portions 77 are stably pressed against the cam surface 64.

The present embodiment includes the flat first restricted surface 76 at the front of the pusher 71 and the flat first restricting surface 25 in the support 23 of the boss 20. By causing the first restricted surface 76 to contact the first restricting surface 25, the pusher 71 is restricted from rotating about the second axis L2 (refer to FIG. 2). Thus, as compared with when a mechanism that restricts the rotation of the pusher 71 is arranged in addition to the pusher 71 and the boss 20, the number of components of the rotation control mechanism 60 is reduced. Further, the rotation control mechanism 60 is reduced in size and the mountability of the rotation control mechanism 60 is improved.

In the present embodiment, the elastic member 81 is mostly arranged in the pusher 71 (large-diameter portion 74) (refer to FIG. 10). Thus, as compared with when the elastic member 81 is arranged outside the pusher 71, the rotation control mechanism 60 is reduced in size. Accordingly, the mountability of the rotation control mechanism 60 is also improved in this respect.

The present embodiment includes the second restricted surface 78 in the pusher 71 and the second restricting surface 28 of the support wall 27. The maximum rotation angle θ1 by which the grip 55 is rotated from the neutral position in the far-side direction is defined by causing the second restricted surface 78 to contact the second restricting surface 28 as the pusher 71 slides. Thus, even when a large force that rotates the grip 55 about the second axis L2 is applied to the grip 55, the grip 55 is restricted from rotating beyond the maximum rotation angle θ1.

The restriction is made for the following reason. In the present embodiment, the second restricted surface 78 is a portion surrounding the insertion hole 72 in one of the side surfaces of the pusher 71. The second restricting surface 28 is a portion surrounding the insertion hole 31 (large-diameter portion 33) in the surface of the support wall 27 facing the support wall 35. Thus, the second restricted surface 78 and the second restricting surface 28 provide a larger area, thereby allowing the wide second restricted surface 78 of the pusher 71 to receive the wide second restricting surface 28 of the support wall 27.

The above-described embodiments may be modified as follows. The above-described present embodiment and the following modifications can be combined as long as the combined modifications remain technically consistent with each other.

When each grip 55 is rotated from the neutral position in the far-side direction, the rotation torque may be generated with a characteristic that differs from the characteristic when the grip 55 is rotated from the neutral position in the near-side direction. In this case, when each grip 55 is rotated about the first axis L1, the operation load and steering feel are differentiated in correspondence with the rotation direction.

The number of contact portions 77 of the pusher 71 may be changed to one, three, or more. In this case, the number of combinations of inclined surfaces 65, 66 is set to be equal to the number of contact portions 77.

The inclination angles of the inclined surfaces 65, 66 may be different from each other depending on where they are located about the second axis L2. For example, on condition that the inclined surfaces 65, 66 are inclined with respect to the plane P1, the inclined surfaces 65, 66 may each be a curved surface that is curved so as to bulge in the direction along the second axis L2 or may each be a curved surface that is curved so as to recess in the direction along the second axis L2.

In this modification, the characteristic of the steering load that is changed by the rotation of each grip 55 can be changed.

The elastic member 81 may be a spring that differs from a compression coil spring.

Alternatively, the elastic member 81 may be a member other than a spring on condition that the member can bias the pusher 71 toward the rotation cam 61.

The second restricted surface 78 and the second restricting surface 28 may be orthogonal to the second axis L2 at an angle that is different from the right angle.

The cam surface 64 of the rotation cam 61 may be located in a surface on the side opposite from the one in the above-described embodiment. That is, the cam surface 64 may be located in a surface closer to the grip 55. In this case, the pusher 71 and the elastic member 81 are located closer to the grip 55 than the rotation cam 61. The pusher 71 is biased toward the first axis L1 by the elastic member 81 so that the contact portions 77 are pressed against the cam surface 64.

The inclined surfaces 65, 66 of the cam surface 64 may be spaced apart from each other on the opposite sides of each boundary 67 in the circumferential direction, and the boundary 67 may be defined by a surface that is parallel to the plane P1.

In order to define the maximum rotation angle θ2 by which each grip 55 at the neutral position is rotated in the near-side direction, the rotation control mechanism 60 may restrict the sliding of the pusher 71 instead of directly restricting the rotation of the rotation cam 61 about the second axis L2.

In order to define the maximum rotation angle θ1 by which each grip 55 at the neutral position is rotated in the far-side direction, the rotation control mechanism 60 may directly restrict the rotation of the rotation cam 61 about the second axis L2, instead of restricting the sliding of the pusher 71.

The above-described steering wheel may be employed in a vehicle other than a land vehicle, such as a steering device for a steering device in an aircraft or a ship.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A steering wheel configured to be employed in a vehicle that includes a steering shaft, the steering shaft including a first axis and rotating in both clockwise and counterclockwise directions with respect to the first axis, the steering wheel comprising:
   a boss configured to be attached to the steering shaft such that the boss and the steering shaft are integrally rotatable;
   two spokes respectively including second axes that extend from the boss away from each other in a left-right direction when the vehicle is traveling straight, the spokes being supported at the boss such that the spokes rotate in the clockwise and counterclockwise directions with respect to the second axes;
   a grip fixed to each of the spokes; and
   two rotation control mechanisms, wherein one of the rotation control mechanisms is located between the boss and one of the two spokes and the other of the two rotation control mechanisms is located between the boss and the other of the two spokes, wherein
   a position of each of the grips about a corresponding one of the second axes when the vehicle is traveling straight is referred to as a neutral position, a direction in which a portion of each of the grips located upward from the corresponding one of the second axes rotates toward a driver is referred to as a near-side direction, and a direction in which the portion rotates away from the driver is referred to as a far-side direction,
   the rotation control mechanisms are each configured to define a maximum rotation angle by which each of the grips is rotated from the neutral position in the near-side direction and a maximum rotation angle by which each of the grips is rotated from the neutral position in the far-side direction and the rotation control mechanisms are each configured to return each of the grips to the neutral position when the vehicle is traveling straight, and
   the maximum rotation angle in the far-side direction is larger than the maximum rotation angle in the near-side direction in each of the rotation control mechanisms.

2. The steering wheel according to claim 1, wherein
   the rotation control mechanisms each include a rotation torque generating mechanism configured to generate a rotation torque and apply the rotation torque to each of the grips when each of the grips is rotated about the corresponding one of the second axes, and
   the rotation torque generating mechanism minimizes the rotation torque at the neutral position.

3. The steering wheel according to claim 2, wherein the rotation torque generating mechanism of each of the rotation control mechanisms maximizes the rotation torque when each of the grips is rotated by either the maximum rotation angle in the near-side direction or the maximum rotation angle in the far-side direction.

4. The steering wheel according to claim 3, wherein the rotation torque generating mechanism of each of the rotation control mechanisms increases the rotation torque as a rotation angle by which each of the grips is rotated from the neutral position increases.

\* \* \* \* \*